United States Patent
Ketchum et al.

(10) Patent No.: US 7,599,875 B1
(45) Date of Patent: Oct. 6, 2009

(54) DUAL QUOTE MARKET SYSTEM

(75) Inventors: Richard G. Ketchum, Alexandria, VA (US); Alfred R. Berkeley, III, Baltimore, MD (US); Joseph Della Rosa, Short Hills, NJ (US)

(73) Assignee: The Nasdaq OMX Group, Inc., Rockville, MD (US)

( * ) Notice: Subject to any disclaimer, the term of this patent is extended or adjusted under 35 U.S.C. 154(b) by 0 days.

(21) Appl. No.: 09/208,942

(22) Filed: Dec. 10, 1998

(51) Int. Cl.
*G06Q 30/00* (2006.01)
(52) U.S. Cl. .............................. 705/37; 705/35; 705/36
(58) Field of Classification Search ................ 705/37, 705/35, 36, 38, 39
See application file for complete search history.

(56) References Cited

U.S. PATENT DOCUMENTS

| | | | | |
|---|---|---|---|---|
| 4,412,287 A | * | 10/1983 | Braddock, III | 705/37 |
| 4,674,044 A | * | 6/1987 | Kalmus et al. | 705/37 |
| 4,903,201 A | * | 2/1990 | Wagner | 705/37 |
| 5,101,353 A | * | 3/1992 | Lupien et al. | 705/37 |
| 5,297,031 A | * | 3/1994 | Gutterman et al. | 705/37 |
| 6,029,146 A | * | 2/2000 | Hawkins et al. | 705/35 |
| 6,195,647 B1 | * | 2/2001 | Martyn et al. | 705/37 |
| 6,618,707 B1 | * | 9/2003 | Gary | 705/36 R |

* cited by examiner

*Primary Examiner*—Nga B. Nguyen
(74) *Attorney, Agent, or Firm*—Fish & Richardson P.C.

(57) ABSTRACT

A system for securities quotes is described. The system and allows posting of a bid and offer price for a security for a proprietary account. The system use a unique market maker identifier for a market maker proprietary account. In response to a customer order, a bid and/or offer price of the customer is posted for the security for an agency account, using a unique market maker agency identifier for an agency account. The quotes are sent to a server that disseminates the proprietary and agency quotes with other quotes for the same security from other market makers.

26 Claims, 4 Drawing Sheets

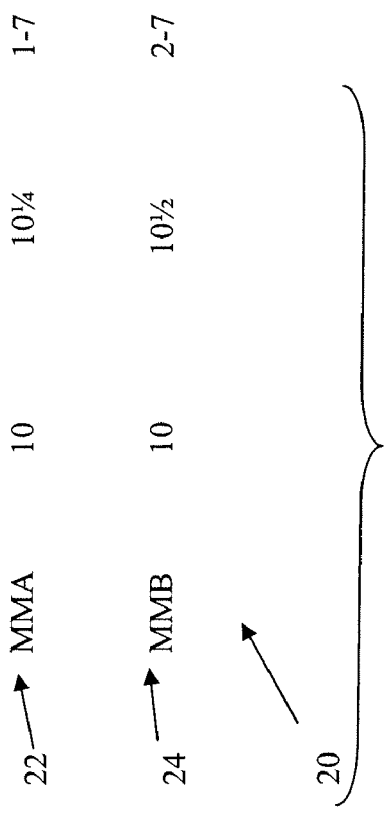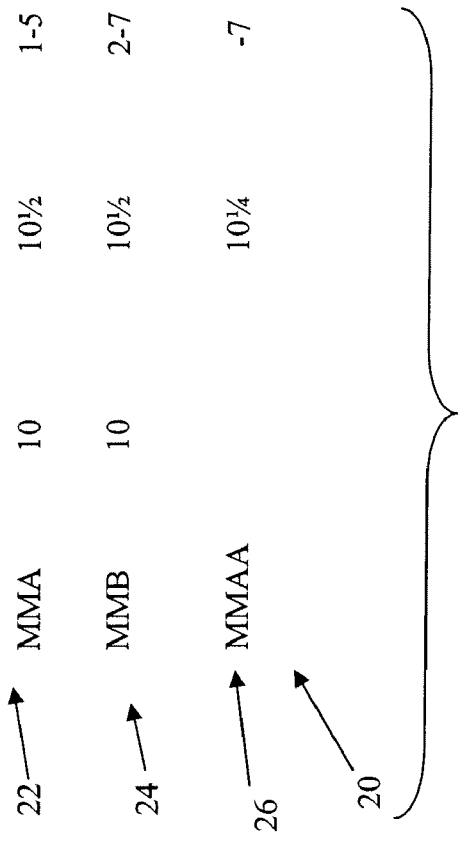

FIG. 4

DUAL QUOTE MARKET SYSTEM

BACKGROUND

This invention relates to order display in a securities market.

Securities markets such as those that trade equity securities can be of several different types. One type is a multi-dealer market in which two or more dealers make a market for a particular equity security. One example of a dealer market is, "The Nasdaq Stock Market®." The Nasdaq Stock Market® is an electronic market for electronically trading equity securities through market makers, also known as dealers. In the Nasdaq Stock Market®, a market maker is effectively required to supply four pieces of information to the electronic market. That is, the market maker is required to have a bid quote or the price that the market maker will buy a security at and an offer quote or the price that the market maker will sell a security at. The market maker also provides a quote size or the number of shares for each of the bid and offer quotes. The market maker is required to maintain a two-sided market.

Before the Securities and Exchange Commission's Order Handling Rules took effect in January 1997, the market maker represented the bid and offer quotes for a proprietary account. With the Order Handling Rules implemented, if the market maker has a customer order that is better than the market maker's proprietary interest, the market maker must now reflect that customer order publicly. This is accomplished by reflecting the customer's order in the market maker's proprietary quote.

SUMMARY

One problem with the current system is that the market maker is representing the client quote, as the market maker's proprietary quote. Since the proprietary quote is a two-sided quote of the market maker, it conveys to the market what the market maker is willing to buy or sell for the market maker's proprietary account. Requiring market makers to display in their quote certain customer orders requires the market maker to adjust the market maker quote. However, to other participants in the market the adjusted quote appears to be the market maker's quote. No one outside of that market maker knows whether the quote is the market maker's quote trading for the market maker's proprietary account or whether the quote reflects a customer order.

According to an aspect of the present invention, a method for quoting securities in a market maker quotation system, executed over a networked computer system, includes posting a bid and offer price for a security for a proprietary account of a market maker, and to reflect a customer order or interest, posting a bid and/or offer price of the customer for the security in an agency account of the market maker.

According to a further aspect of the invention, a method for quoting securities, executed over a networked computer system, includes posting a bid and offer price for a security for a proprietary account. The method uses a unique market maker identifier corresponding to a market maker that is different from market maker identifiers for a plurality of other market makers. In response to a customer order, the method also includes posting a bid and/or offer price of the customer for the security in an agency account, using a unique market maker agency identifier for the agency quote of the market maker that is different from market maker agency identifiers for the plurality of other market makers. The method also includes sending the agency quote to a server that disseminates the agency quote with other quotes for the same security from the plurality of other market makers.

According to a still further aspect of the present invention, a market maker quotation system, for entering quotes for securities by a market maker, includes a process to cause the quotation system to post a bid and offer price for a security for a proprietary account of the market maker, and to reflect a customer order or interest, post a bid and/or offer of the customer for the security in an agency account of the market maker.

According to a still further aspect of the present invention, a client system to enter quotes for securities to reflect a client's order or interest includes a process to enter an agency quote for a bid and/or offer for an agency account into a quote system and send the agency quote to a server that disseminates the agency quote with other quotes for the same security from other market makers.

According to a still further aspect of the present invention, a computer program product residing on a computer readable medium for providing quotations for securities, the computer program product includes instructions for causing a computer to post a bid and offer price for a security for a proprietary account, and to reflect a customer order or interest, post a bid and/or offer price of the customer for the security in an agency account.

One or more of the following advantages may be provided from various aspects of the invention. The invention allows the expression of a market maker's interest for a proprietary account that optionally may include expressions of customer interest. The market maker maintains its own two-sided quote that tells the public what the market maker is willing to buy and sell a security at for its proprietary account. When a market maker holds certain customer orders that are subject to display, rather then adjusting quote sizes in the proprietary account, the provision of an agency quote allows that interest to be independently reflected. The prices on the agency quote can be completely different or the same as the prices and sizes for the market maker's proprietary quote. Thus, the proprietary and agency quotes of the market maker can change in tandem or be totally independent of each other. While the market maker is required to have a two-sided quote, both a bid quote and an offer quote with associated sizes, in the agency quote there may only be a customer buy or a customer sell order so the agency quote can be a one sided quote i.e., a bid or an offer. The agency quote can reflect a two-sided quotation if there are customer orders on both sides.

BRIEF DESCRIPTION OF THE DRAWINGS

FIGS. 2A and 2B are diagrams that respectively depict quotation information for proprietary accounts and for proprietary and agency accounts.

FIG. 4 is a screen shot of a typical quotation screen using the process of FIG. 3.

DESCRIPTION

Figure 1:
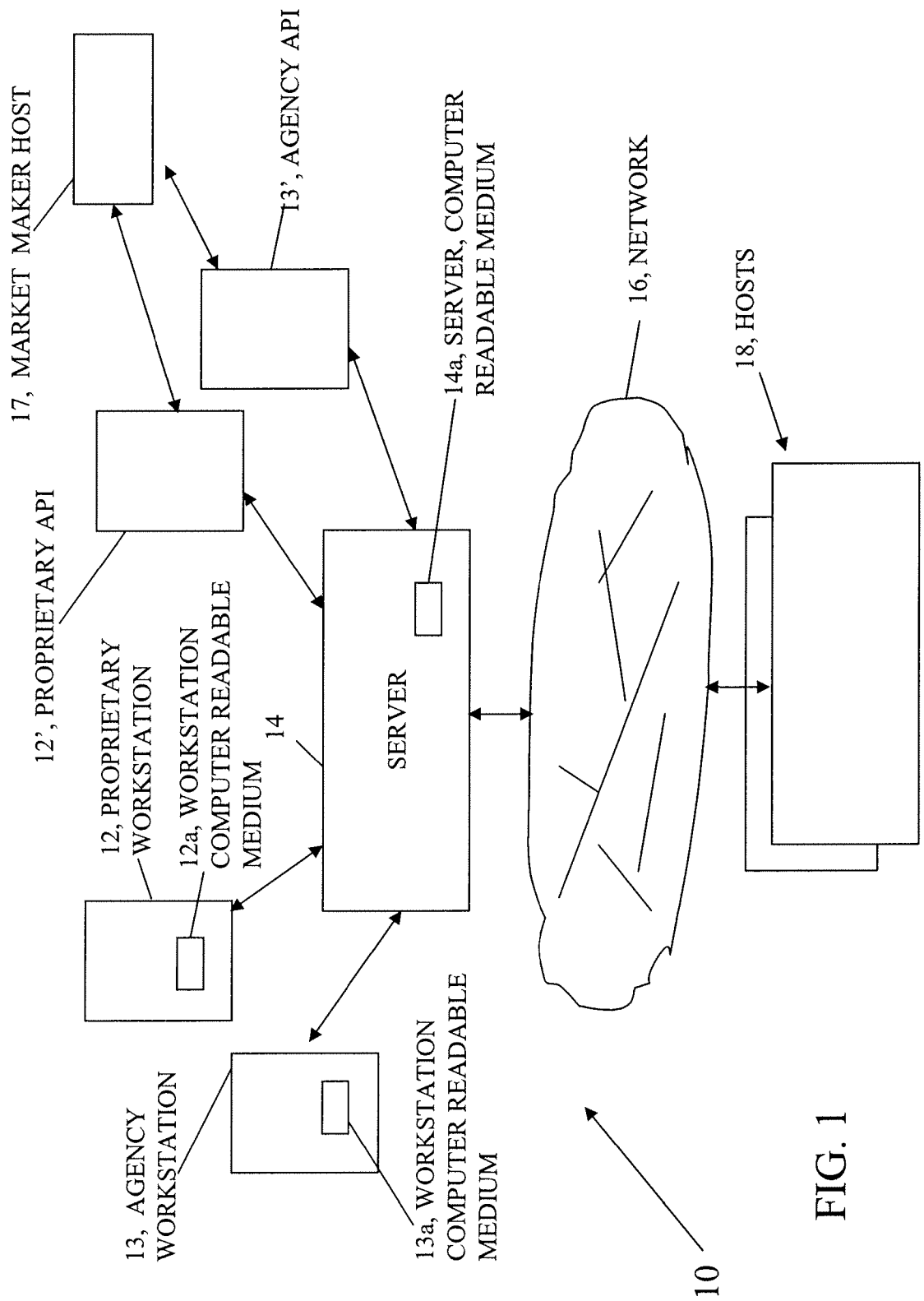
FIG. 1 is a block diagram of a networked computer system adapted for trading of securities.
Figure 3:
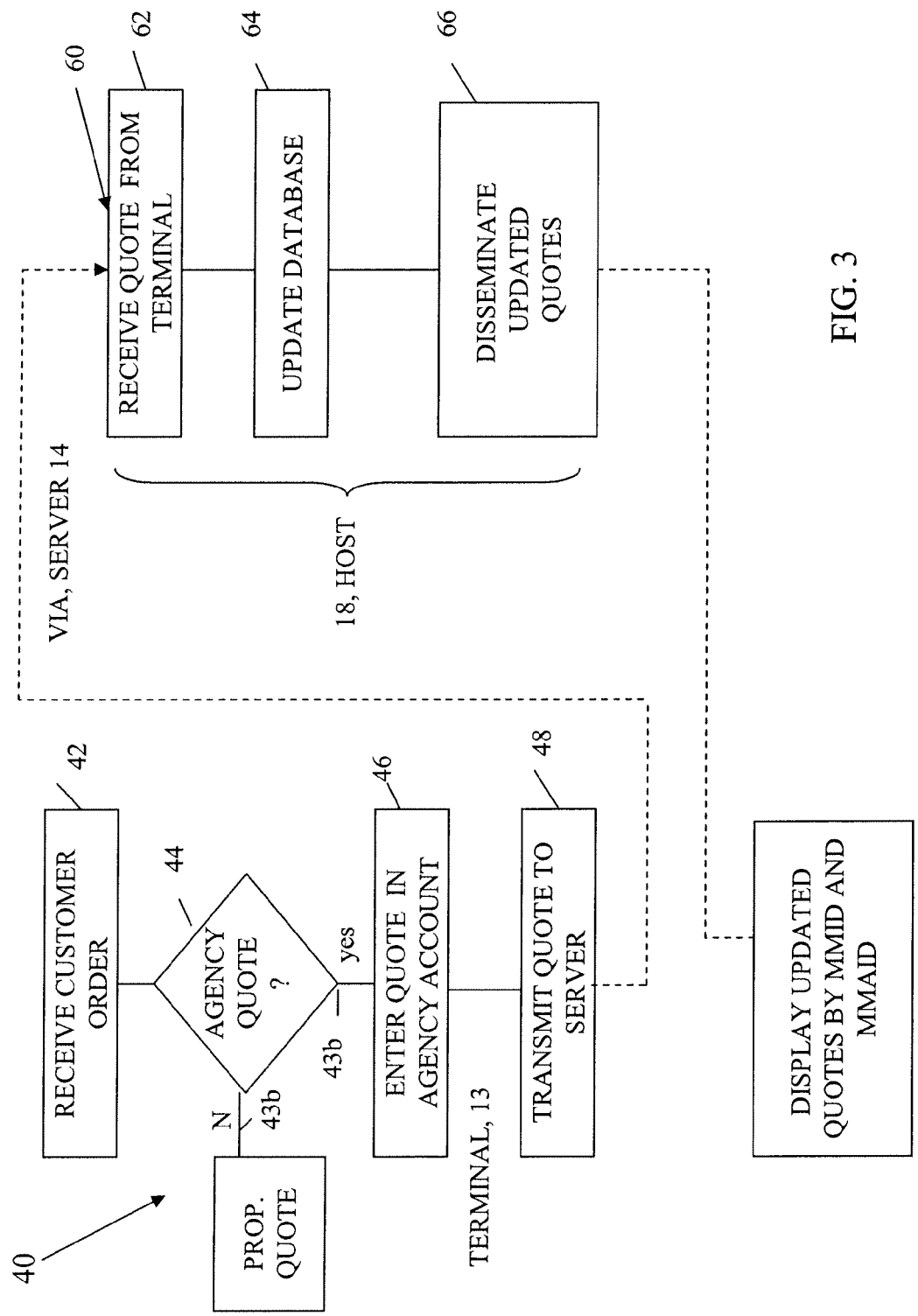
FIG. 3 is a flow chart of an agency quotation process.

Referring now to FIG. 1, a system 10 that is an electronic market for the quotation and trading of securities such as equities, bonds, and the like is shown. An example of such a system is The Nasdaq Stock Market®. The system 10 includes a workstation 12 14 that includes a computer readable medium 12a for quote processing on the workstation (FIG. 3) or a market maker developed software connection, via an API 12' (application program interface) that are at market maker's facilities. The workstation 12 or API 12' are used inter alia to enter and display quote information and trade information and facilitate entry of orders and receipt of execution of orders for the market maker's proprietary account. The workstation 12 or API 12' (through a host computer system 17) are coupled to a service delivery platform server 14 that includes a computer readable medium 14*a* for quote processing on the server (FIG. 3). Thus, while the workstation 12 can be directly coupled to the service delivery platform server 14, the API 12' is executed on the computer system host 17 that is coupled to the service delivery platform server 14. Thus, there are two separate device options for entering quote information for a proprietary account.

The system 10 includes another device 13 that includes a computer readable medium 14*a* for quote processing on the workstation (FIG. 3) in the market maker's facility that is assigned for inputting agency quotes. Alternatively, the market maker can have an agency API 13' coupled to the host 17. The agency entry workstation 13 or agency API 13' are used to enter agency quotes, as will be described below. The same service delivery platform server 14 can process both agency and proprietary quotes. The service delivery platform server 14 is directly connected into a network 16 that feeds information from and to market maker firms via market maker devices, i.e., workstations 12, 13 or API's 12", 13." The service delivery platform server 14 acts as a data concentrator where the system 10 can take data from, e.g., eight devices and transmit that data up to hosts 18. The service delivery platform server 14 is the interface between the market's host computer systems 18 in which trades are captured and disseminated, and the market maker's workstations 12 or API's 12'. The data are transmitted from the service delivery platform server 14, via the network 16, to the host computers 18.

Referring now to FIG. 2A, a depiction 20 of quote information, as it might appear on a display (not shown) on one of the workstations 12 or host 17 is shown. On a first line 22 is the designation 'MMA'. This designation is a market maker identifier "MMID" for a particular market maker "A." To the right of that designation on the same line are the numbers "10" and "10¼" followed by the numbers "1-5." This is a conventional representation on The Nasdaq Stock Market® for the proprietary account for a market maker "A" that has a bid price of $10 a share and an offer price of $10¼ a share for a particular stock (not specified in FIG. 2A). The quote size is "1-5" meaning that the bid price 10 is to buy "1" lot or 100 shares and offer price 10¼ is to sell "5" lots or 500 shares.

For any stock there can be from 2 to 60 or 70 or more market makers. Therefore, on a second line 24 is the designation "MMB". This designation is the market maker identifier "MMID" for a second market maker "B." To the right of that designation on the same line are the numbers "10" and "10½" followed by the numbers "2-7." This is a conventional representation on the Nasdaq Stock Market for the proprietary account for a market maker "B" that has a bid price of $10 a share and an offer price of $10½ a share for a particular stock. The quote size is "2-7" meaning that the bid price "10" is to buy "2" lots or 200 shares and offer price "10½" is to sell "7" lots or 700 shares.

In this example there are only two market makers in the stock, "market maker A" and "market maker B." These entries 22, 24 are the public expression of their proprietary interests. Each entry 22, 24 is a two-sided quote that tells the public what the market makers are willing to buy and sell at for their proprietary accounts. Market maker A and market maker B would enter their quotes on workstations 12 or API's 13, at their respective facilities.

If one or both of the market makers hold certain customer orders, e.g., market maker A holds a customer offer of "10¼" for 5 lots, this offer may be subject to display. Conventionally, the market maker A adjusts its quote size or displays the customer order. Thus, the first line 22 has the entries "10" and "10¼" followed by the numbers "1-5." The customer quote is entered on proprietary quote device 12 and is reflected as A's proprietary offer quote identified by the designation "MMA." In this example, if market maker A had an offer quote for "10½" at a quote size of "7", it would not be reflected to the market, since its client's offer quote is better. However, to the rest of the market it appears that the client's offer quote is actually the market maker's offer quote.

Referring now to FIG. 2B, a depiction 20' of quote information for the system 10 (FIG. 1) that implements an agency quote is shown. On a first line 22 is the designation "MMA." This designation is a market maker identifier "MMID" for market maker "A" as mentioned above. To the right of that designation on the same line are the numbers "10" and "10½" followed by the numbers "1-5." This is the representation on The Nasdaq Stock Market® for the proprietary account for a market maker "A" that has a bid price of $10 a share and an offer price of $10½ share for a particular stock (not specified in FIG. 2B). The quote size is "1-5", as described above. On the second line 24 is the designation "MMB" for the second market maker "B", as also described above. To the right of that designation on the same line are the numbers "10" and "10½" followed by the numbers "2-7", as described above. These entries 22, 24 are the public expression of their respective interests. These entries may include expressions of customer interest. Each entry 22, 24 is a two-sided quote that tells the public what the market makers are willing to buy and sell the stock at for their proprietary accounts. Market maker A and market maker B would enter their quotes on workstations 12 or API's 12' at their respective facilities.

If one or both of the market makers hold certain customer orders that were subject to display, as above, rather than adjusting their quote sizes, an agency quote process (described in conjunction with FIG. 3) adds a third line 26 having the designation 'MMAA' which is "market maker's A" agency quote. The agency quotes are entered on agency quote devices such as the workstation 13 or the API 13'. The quotes on the agency entry 26 can be completely different from or the same as the quotes for market maker A's proprietary quote. The quotes can change in tandem or totally independent of each other. As an example, for the customer order mentioned in FIG. 2A, an agency offer of "10¼" at a quote size of "7" or 700 shares is shown. This quote now reflects the customer order in the market maker's agency rather than proprietary.

While the market maker is required to have a two-sided quote, both a bid quote and an offer quote with associated sizes, in the agency quote there may only be a customer buy or a customer sell order so the agency quote can be a one-sided quote, i.e., a bid or an offer. The agency quote can reflect a two-sided quotation if there are customer orders on both sides. Different customer orders can be commingled and reflected in the same agency quote.

As shown in FIG. 2B, the agency quote includes an unique agency identifier "MMAA" that can be used to represent any customer order, whether the customer order is from an in-house customer or a broker/market maker customer. Such orders are represented as the agency quote and are coupled into the system on the agency quote workstation 13 or API 13' (FIG. 1). The agency workstation 13 or API 13' is a separate device from the proprietary quote workstation 12 or API 12'. The workstation 13 or API 13' would be similar to other existing devices, but during a log on session the workstation 13 or API 13' is identified to the service delivery platform server 14 with a market maker agency identifier "MMAID". Otherwise, the hardware could be identical to current Nasdaq® terminal systems, except the log on and password would identify the workstation 13 or API 13' with a unique market maker agency identifier (MMAID).

The agency workstation 13 or API 13' is used to input a second set of quotes. The second set of quotes are used to represent customer orders. Thus, when a market maker has a customer order to buy stock, the market maker may enter the customer order as bid quote with a bid price and a quote size. The information is sent back to the service delivery platform server 14 where it is forwarded to the host 18 for inclusion in the montage (FIG. 4) for the same security from other market makers. It is disseminated to other market makers, via the Nasdaq Workstation II® (NWII) and to the vendor quote community via the Nasdaq® Quotation and Dissemination Service (NQSD). The agency quote for a particular market maker is displayed in a similar manner, as proprietary quotes, except that the agency quote is identified with the unique market maker agency identifier (MMAID) for the particular market maker. It is possible to aggregate all agency quotes for a particular stock and display them in a single, agency quote (not shown), in addition to the unique agency quote. The aggregated agency quote would represent all agency quotes from all corresponding market makers.

Referring now to FIG. 3, an agency quote process 40 is shown. The workstation 13 or API 13', for the proprietary and agency quotes are logged on to the service delivery platform server 14. A log on process is used for the market maker for a proprietary quote and a separate log on process is used for the market maker's agency quote. Generally, log on processes occur at the start of a trading day on each of the work stations 12 and 12' and API's 13 and 13' (FIG. 1). The agency quote process 40 receives 42 an agency quote or an order. In the market maker's environment, a customer order comes in. It can come in from a broker/market maker on a telephone call, or from a customer over the Internet or via a telephone call to an account executive. The customer order could come in through some automated system that the market maker has at the market maker facilities.

The process 40 decides 44 (e.g., automatically based on agency quote heuristics or by the market maker) if the market maker wants to reflect that order as an agency quote. If the order is reflected as a proprietary quote 43b, the market maker enters 46 the quote through the workstation 12 or API 12'.

If the order is to be reflected as an agency quote 43a the market maker enters 46 the quote through the workstation 13 or API 13'. In general, most customer orders can be reflected in the agency quote. For example, orders between 100 and 10,000 shares would be reflected unless the customer did not want to reflect the quote. The agency quote with the associated market maker agency identifier (MMID) is processed in a similar manner, as a proprietary quote. That is, the agency quote 43a is transmitted 48 to the service delivery platform server 14 for forwarding to the host 18 (FIG. 1) and could be automatically executed and could be eligible for receipt of delivered orders in the market's order delivery system.

The agency quote process 40 receives updated quote information from the service delivery platform server 14 and displays 50 the updated information on the terminal or display associated with the work stations 12 and 12' or via API's 13 and 13' (FIG. 1) by host 17. The proprietary quotes are displayed by unique proprietary identifiers, i.e., the market maker identifiers. The agency quotes are displayed by agency identifiers, i.e., by unique market maker agency identifiers (MMAID) that uniquely identify agency accounts of the market makers.

A computer software process 60 on the host 18 could process the agency quote. The agency quote from agency quote process 40 is processed in much the same way as a proprietary quote. The process 60 receives 62 the quote and updates 64 a database (not shown) to reflect the quote with other existing quotes for the same security. The host 18 could sort the quotes, (e.g., by best quote on top) and disseminate 66 the updated quote information to the system 10 identifying proprietary quotes by the market maker identifier MMID and the market maker agency quotes by the market maker agency identifier (MMAID).

Figure 4:
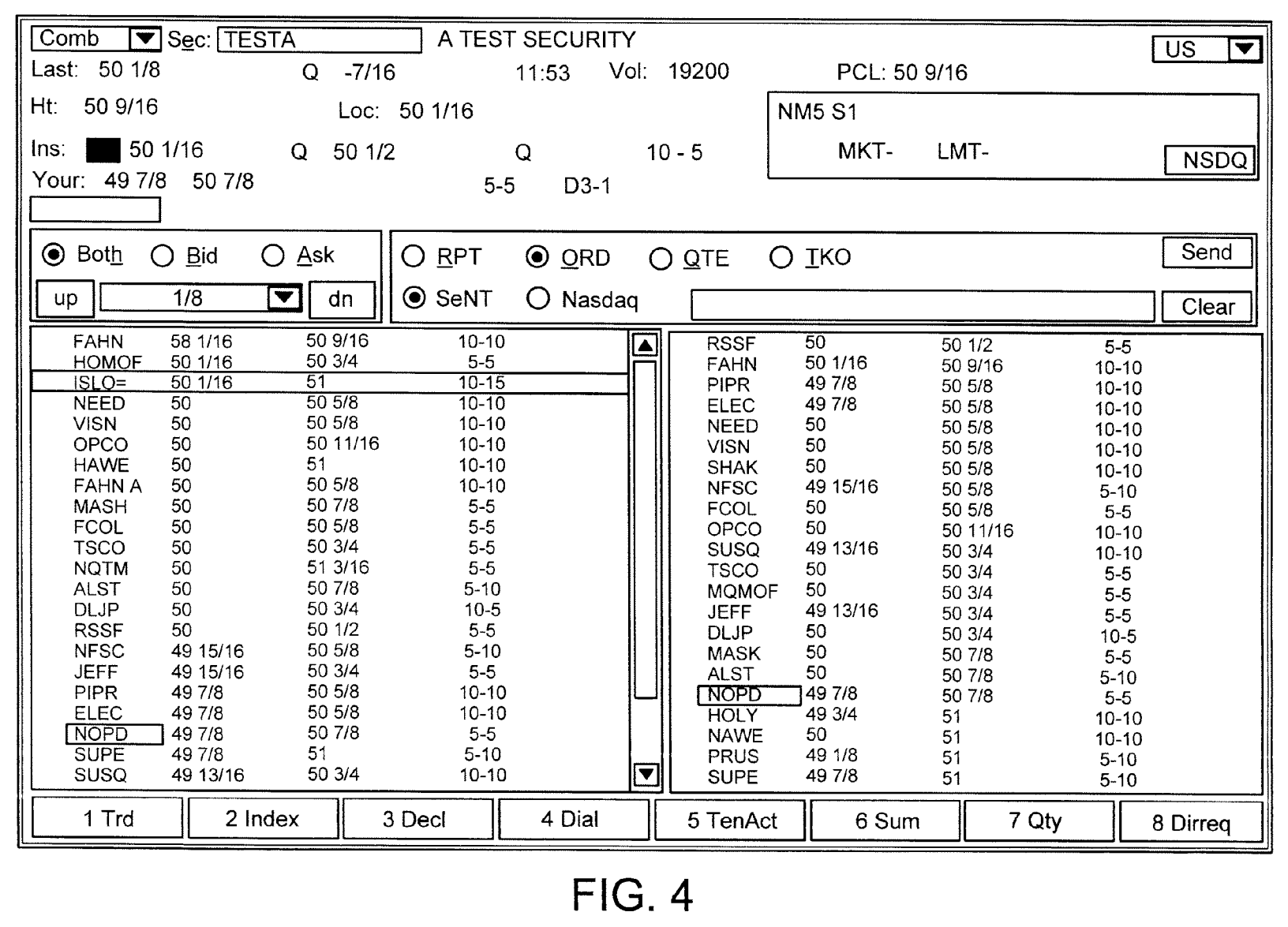

Referring now to FIG. 4, an exemplary screen shot 80 that shows an agency quote 82 "FAHNA" intermingled with proprietary quotes e.g., "FAHN" 84 is shown. The agency quote 82 has a unique identifier, e.g., "A", as a fifth character, attached to the market marker's four symbol representation "FAHN" that indicates that the quote is "FAHN's" agency quote. The fifth character can also be used for other purposes. For example, the fifth character can be used as a location identifier and can contain a unique character, such as a pound (#) sign, to uniquely identify the entity as an electronic communication network (ECN).

An ECN is another type of market participant (e.g., ISLD#, 86) in the electronic exchange. The display uniquely identifies ECN's by appending a pound sign "#" symbol to the end of their market participant identifier (MPID). The use of the pound sign uniquely identifies one type of participant. The fifth character can also identify a location of a participant. An alternative to using an "A" in the fifth character to represent the agency quote is to have the agency quote of a market maker be another unique four symbol permutation of the market maker's identifier, a new unique four symbol representation, or another unique character in the fifth character position, such as an ampersand sign, and so forth.

While an agency quote can be a one-sided or two-sided quote, the treatment of the agency quote in the system in terms of execution systems and how they are ranked on the screen in terms of price, time, priority, can be treated as any other quote. To allow for an MMAID quote may require an expansion in the number of positions in any specific security.

Other Embodiments

It is to be understood that while the invention has been described in conjunction with the detailed description thereof, the foregoing description is intended to illustrate and not limit the scope of the invention, which is defined by the scope of the appended claims. Alternative arrangements are possible. For example, the same device operating with different sessions or processes could be used to enter separate proprietary and agency quotes on the same machine. Moreover, it is to be understood that the use of a market system such as The Nasdaq Stock Market® is exemplary. Other types of markets could use the invention and, moreover, it is not necessarily limited to market maker markets, but could be used whenever a second vehicle for expressing a trading interest is desired. Other aspects, advantages, and modifications are within the scope of the following claims.

What is claimed is:

1. A computer implemented method for quoting securities in a market maker quotation system, executed over a networked computer system, the method comprising:
   receiving by a computer system for display in the market, at least one quote reflecting at least one of a bid and offer price for a security to reflect a proprietary position of a market maker type of participant; and receiving by the computer system for display in the market, using a separate quote reflecting at least one of a bid and/or offer price for the security to reflect a customer order or interest.

2. The method of claim 1 wherein posting for the proprietary position comprises:

entering quotes for bids and offers into a quote system; and sending the quotes to a server that disseminates the bid and offer quotes from the market maker, along with quotes for the same security from other market makers.

3. The method of claim 2 wherein quotes by the market maker and the plurality of other market makers are identified by unique market maker identifiers.

4. The method of claim 3 wherein posting in response to a client order or interest comprises:

entering an order for a security and reflecting that as an agency bid quote and/or offer quote into the quote system over a different session of the quote system than posting of quotes for the proprietary position; and sending the agency bid or offer quote to a server that disseminates that agency bid or offer quote, for display and by a unique agency identifier with other quotes for the same security from the market makers.

5. The method of claim 4 wherein each agency quote that is entered by the market maker is identified with a unique market maker agency identifier that is comprised of the market maker's identification and a symbol adjacent the market maker's identification indicating that the quote is an agency quote.

6. The method of claim 1 wherein posting for a proprietary position further comprises:

using a unique market maker identifier for the market maker that is different from market maker identifiers for other market makers, and wherein posting in an agency position further comprises:

using a unique market maker agency identifier for the agency quote that is posted by the market maker that is different from market maker agency identifiers for other market makers.

7. The method of claim 1 further comprising:

receiving posted proprietary quotes and agency quotes by a server that disseminates quotes for display from the market maker and other market makers for the same security.

8. The method of claim 6 further comprising:

disseminating for display the bid and ask proprietary quotes from the market maker to the other market makers and the public for the security, identifying the bid and ask proprietary quotes by the unique market maker identifier; and sending the bid and/or ask quotes identified by a market maker agency identifier, from customers of the market maker to the other market makers and the public for the security.

9. The method of claim 8 wherein disseminating quotes comprises:

sorting the quotes by best bid and best offer so that a public display of the quotes displays the best bid and best offer quotes on the top of the display.

10. A method for quoting securities executed over a networked computer system, the method comprising:

receiving by a computer system, for display on a display device a bid and offer proprietary quotes of a market maker for a security using a unique market maker identifier corresponding to the market maker that is different from market maker identifiers for other market makers; and in response to a customer order, by the computer system, for display on the display device a bid and/or offer, as a separate quote, reflecting a order for a customer, using the unique market maker identifier and an additional symbol that indicates the separate quote is an agency quote for a customer of the market maker; and sending the agency quote to a server that disseminates that agency quote with other quotes for the same security from the market makers.

11. A quotation system for entering quotes for securities by a market maker, the system comprising:

a computer, comprising a processor; and a computer readable medium storing a computer program product for executing a process to cause the quotation system to:

post a bid and offer quote for a security for a proprietary account of a market maker; and to reflect a customer order or interest, post a separate bid and/or offer quote of the customer for the security to reflect to the market customer interest separate from proprietary interest in the security.

12. The system of claim 11 further comprising:

a server; and wherein the process that posts for the proprietary account further comprises a process to cause the networked computer system to:

allow entry of quotes for bids and offers into the quote system; and send the quotes to the server that disseminates the bid and offer quotes from the market maker along with quotes for the same security from other market makers.

13. The system of claim 12 wherein quotes by the market maker and the other market makers are identified by unique market maker identifiers.

14. The system of claim 11 wherein the quotation system is a client system to post quotes in response to a customer order and a client system to post quotes for a proprietary account.

15. The system of claim 11 wherein the computer program product further comprises instructions to cause the quotation system to:

post quotes for a proprietary account with a unique market maker identifier for the market maker.

16. The system of claim 11 wherein the computer program product further comprises instructions to cause the quotation system to:

post quotes for the customer account, as an agency quote having a unique market maker identifier and agency indication that identifies those quotes for the customer account as customer quotes of the market maker associated with the unique market maker identifier.

17. A client system to enter quotes for securities to reflect a customer order or interest comprises:

a computer executing a process to:

enter an agency quote for a bid and/or offer for an agency account into a quote system; and send the agency quote identified with a unique market maker agency identifier to a server that disseminates for display to the market that agency quote with other quotes for the same security from other market makers.

18. The client system of claim 17 wherein the unique market maker agency identifier is comprised of a market marker identifier that is different from other market maker identifiers in the market and a symbol that indicates that the quote is an agency quote.

19. A computer program product residing on a computer readable medium for providing quotations for securities, the computer program product comprising computer executable instructions for causing a computer to:
- post, for display to the market a bid and offer quote for a security for a proprietary account; and to reflect a customer order or interest,
- post, for display to the market a separate bid and/or offer quote of the customer for the security.

20. The computer program product of claim 19 wherein instructions that cause the computer to post quotes for a proprietary account further comprises instructions to cause the computer to:
- use a unique market maker identifier corresponding to the market maker to post the bid and offer quote for the proprietary account, and wherein instructions to post the separate quote of the customer further comprises instructions to:
- use a unique market maker agency identifier to represent the separate quote.

21. The method of claim 1 wherein market maker type of participant includes a market maker, an electronic communication network or any entity that posts quotes that represent a proprietary position.

22. The method of claim 10 wherein market maker includes a market maker, an electronic communication network or any entity that posts quotes that represent a proprietary position.

23. The method of claim 10 wherein posting proprietary quotes comprises:
- entering quotes for bids and offers into a quote system.

24. The method of claim 23 wherein posting in response to a customer order comprises:
- entering an order for a security and reflecting that order as a bid quote or an offer quote into the quote system over a different session of the quote system than was used for posting of the proprietary quotes.

25. The method of claim 10 further comprising:
- disseminating for display the bid and ask proprietary quotes from the market maker and any agency quotes of the market maker to the other market makers and the public.

26. The method of claim 25 wherein disseminating quotes comprises:
- sorting all of the quotes by best bid and best offer so that a display of the quotes displays the best bid and best offer quotes on the top of the display.

* * * * *